United States Patent
Chou et al.

(10) Patent No.: US 12,554,345 B1
(45) Date of Patent: Feb. 17, 2026

(54) KNOB STRUCTURE

(71) Applicant: ICHIA TECHNOLOGIES, INC., Taoyuan (TW)

(72) Inventors: Chung-Ching Chou, Taoyuan (TW); Chung-Yu Chen, Taoyuan (TW)

(73) Assignee: ICHIA TECHNOLOGIES, INC., Taoyuan (TW)

( * ) Notice: Subject to any disclaimer, the term of this patent is extended or adjusted under 35 U.S.C. 154(b) by 0 days.

(21) Appl. No.: 18/974,918

(22) Filed: Dec. 10, 2024

(30) Foreign Application Priority Data

Aug. 14, 2024 (TW) .................................. 113130389

(51) Int. Cl.
  *G06F 3/0362* (2013.01)
  *G06F 3/02* (2006.01)
  *G06F 3/039* (2013.01)

(52) U.S. Cl.
  CPC .............. *G06F 3/0362* (2013.01); *G06F 3/02* (2013.01); *G06F 3/0393* (2019.05)

(58) Field of Classification Search
  CPC ......... G06F 3/0362; G06F 3/0393; G06F 3/02
  USPC ....................................................... 345/184
  See application file for complete search history.

(56) References Cited

U.S. PATENT DOCUMENTS

| | | | |
|---|---|---|---|
| 2013/0088423 A1 | 4/2013 | Kim | |
| 2024/0111373 A1* | 4/2024 | Weber | G06F 3/038 |
| 2024/0345672 A1* | 10/2024 | Fujisawa | G06F 3/0393 |

FOREIGN PATENT DOCUMENTS

| | | | | |
|---|---|---|---|---|
| CN | 101540602 A | * | 9/2009 | ........... H03K 17/969 |
| TW | 201738917 A | | 11/2017 | |

* cited by examiner

*Primary Examiner* — Stephen G Sherman
(74) *Attorney, Agent, or Firm* — Li & Cai Intellectual Property (USA) Office

(57) ABSTRACT

A knob structure is configured to be installed on a touch function display panel, and includes a seat, at least one conductive pad, a conductive member, an operating cover, and a conductive film. The at least one conductive pad is disposed on the seat. When the at least one conductive pad is triggered, the at least one conductive pad is configured to send a signal to the touch function display panel. The conductive member has a first end portion and a second end portion opposite to the first end portion. The first end portion is abutted against the seat and is electrically coupled to the at least one conductive pad. The operating cover is disposed on the seat, and is configured for contact with a human body to receive a trigger charge.

8 Claims, 4 Drawing Sheets

KNOB STRUCTURE

CROSS-REFERENCE TO RELATED PATENT APPLICATION

This application claims the benefit of priority to Taiwan Patent Application No. 113130389, filed on Aug. 14, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a knob structure, and more particularly to a knob structure installed on a touch function display panel.

BACKGROUND OF THE DISCLOSURE

Conventionally, existing knob structures are operated primarily by pressing or rotating. Pressing is typically used to activate functions or execute specific actions, while rotating is a common method for adjusting settings or selecting different modes. However, while the aforementioned methods of operation have been used for many years, they also limit the flexibility of product design for such structures.

SUMMARY OF THE DISCLOSURE

In response to the above-referenced technical inadequacy, the present disclosure provides a knob structure.

In order to solve the above-mentioned problems, one of the technical aspects adopted by the present disclosure is to provide a knob structure. The knob structure includes a seat, at least one conductive pad, a conductive member, an operating cover, and a conductive film. The at least one conductive pad is disposed on the seat. When the at least one conductive pad is triggered, the at least one conductive pad is configured to send a signal to the touch function display panel. The conductive member has a first end portion and a second end portion that is opposite to the first end portion. The first end portion is abutted against the seat and is electrically coupled to the at least one conductive pad. The operating cover is disposed on the seat. The operating cover is configured for contact with a human body to receive a trigger charge. The conductive film is disposed on an inner edge of the operating cover and abutted against by the second end portion. The conductive film is configured to receive the trigger charge through the operating cover, and is configured to trigger the at least one conductive pad via the conductive member.

Therefore, in the knob structure provided by the present disclosure, by virtue of "the first end portion being abutted against the seat and being electrically coupled to the at least one conductive pad," "the conductive film being disposed on an inner edge of the operating cover and being abutted against by the second end portion," and "the conductive film being configured to receive the trigger charge through the operating cover, and being configured to trigger the at least one conductive pad via the conductive member," the knob structure can also transmit signals through a grasping operation to control a touch function display panel.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
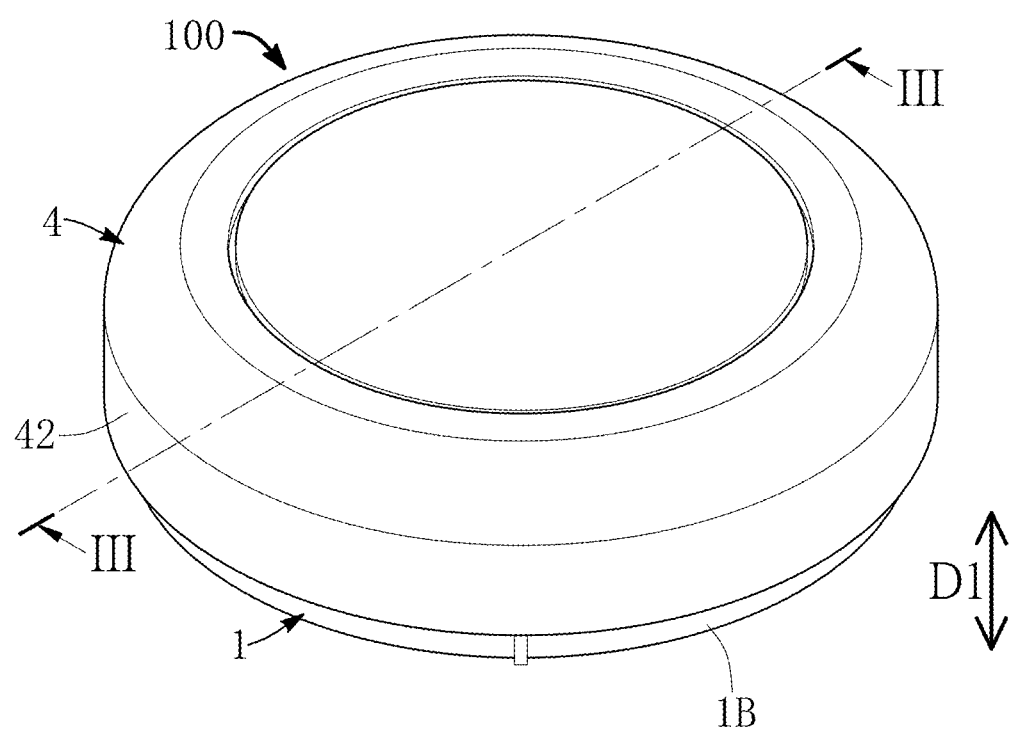
FIG. 1 is a schematic perspective view of a knob structure according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 4, an embodiment of the present disclosure provides a knob structure 100, and the knob structure 100 is configured to be installed on a touch function display panel (not shown). In practice, the operation signals sent by the knob structure 100 are recognized and responded to by an application within the touch function display panel. The recognition and response between the knob structure 100 and the touch function display panel are not only based on existing technology, but are also known to those of ordinary skill in the art and are not the focus of the present disclosure, so that details thereof will not be described herein.

Figure 2:
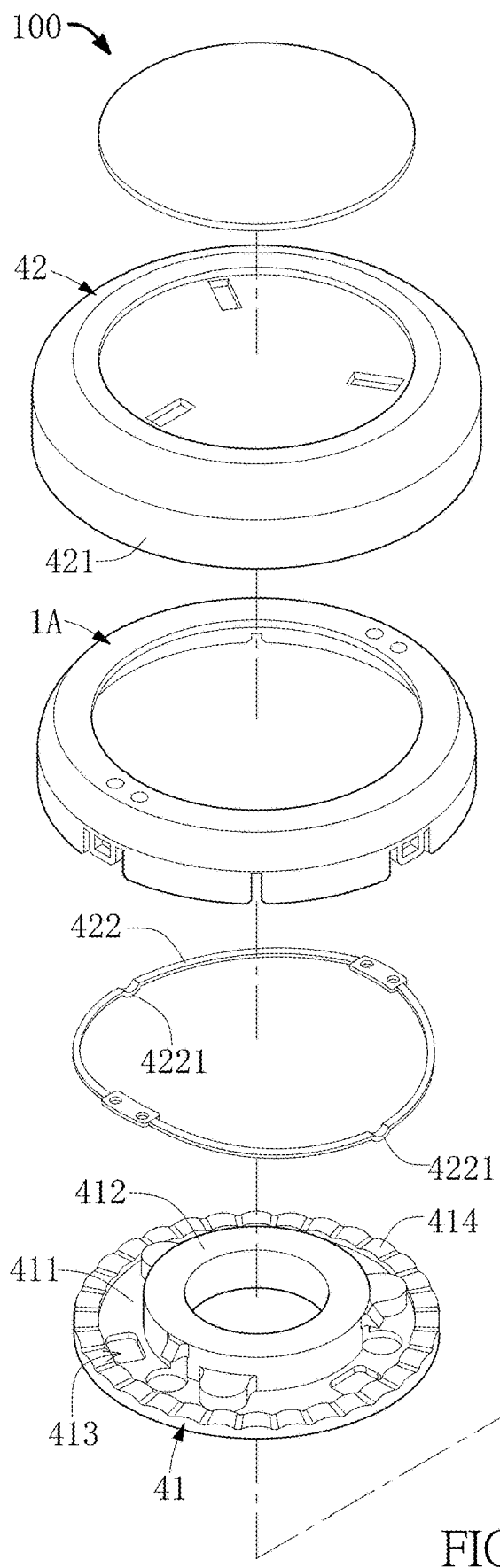
FIG. 2 is a schematic exploded view of the knob structure according to the present disclosure.
Figure 2:
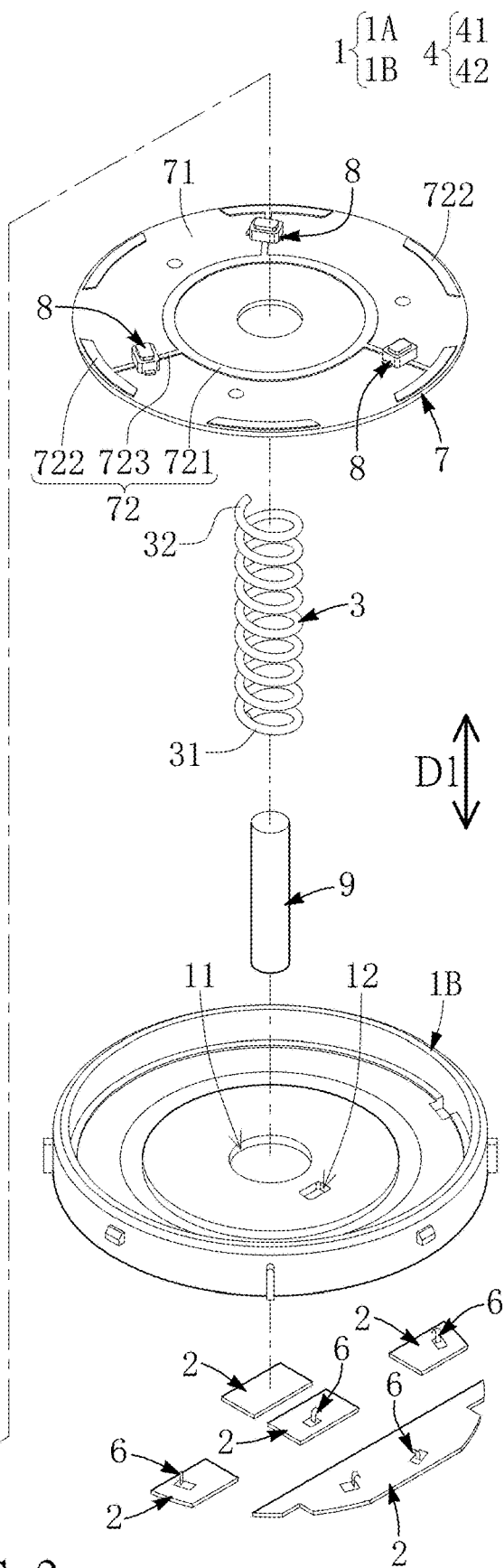
Figure 3:
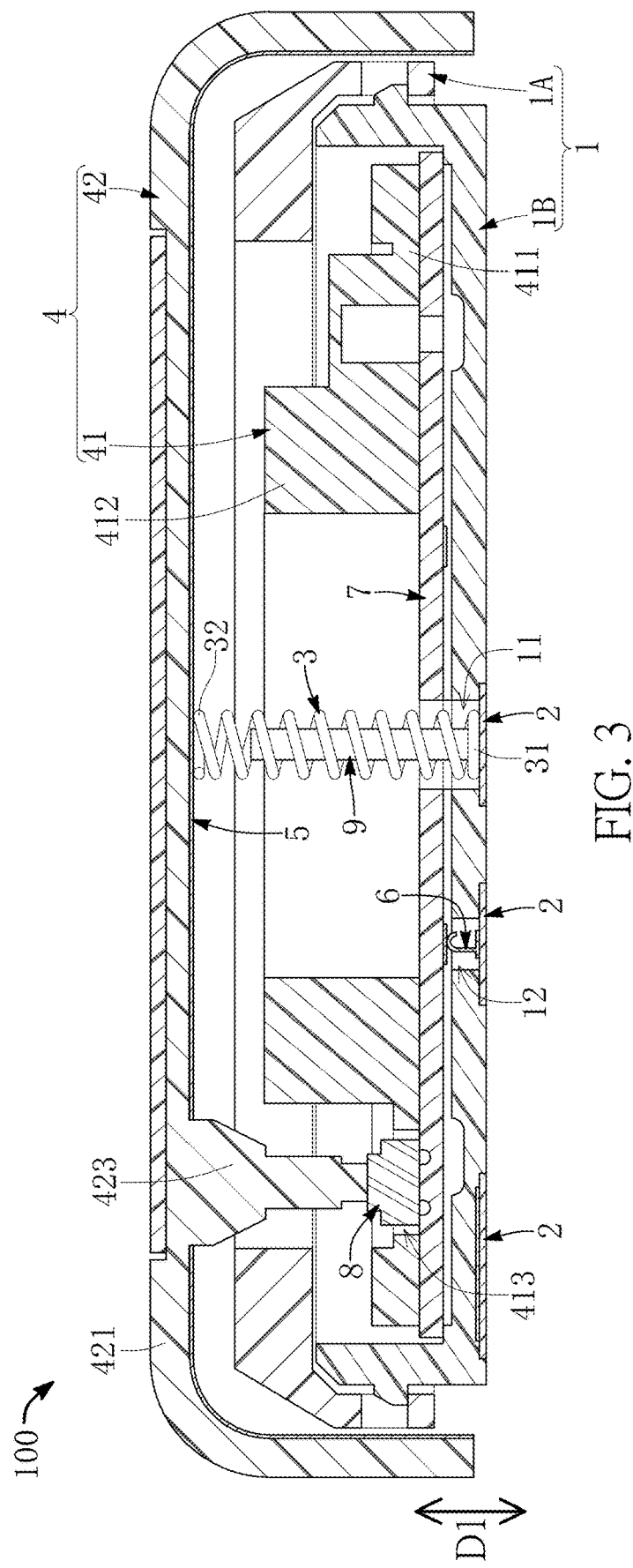
FIG. 3 is schematic cross-sectional view taken along line III-III of FIG. 1.

Referring to FIG. 1 to FIG. 3, the knob structure 100 includes a seat 1, at least one conductive pad 2 disposed on the seat 1, a conductive member connected to the at least one conductive pad 2, an operating cover 4 installed on the seat 1, and a conductive film 5 that is disposed on an inner edge of the operating cover 4 and abutted against by the conductive member. The following description describes the structure and connection relation of each component of the knob structure 100.

Referring to FIG. 2 and FIG. 3, in the present embodiment, the seat 1 is made of an insulating material and includes an upper component 1A and a lower component 1B, but the present disclosure is not limited thereto. The seat 1 has a first perforation 11, which is preferably located at a central area of the seat 1, but the present disclosure is not limited thereto. For example, in another embodiment of the present disclosure (not shown), the first perforation 11 may be located near an outer edge of the seat 1.

Referring to FIG. 2 and FIG. 3, the at least one conductive pad 2 is disposed on a bottom surface of the seat 1 (i.e., a side of the seat 1 facing the touch function display panel) and corresponds in position to the first perforation 11. A portion of the at least one conductive pad 2 can be exposed through the first perforation 11 to a side of the seat 1 that is away from the touch function display panel, allowing for placement of the conductive member. Additionally, the at least one conductive pad 2 can be used to contact a sensing area of the touch function display panel, and when the at least one conductive pad 2 is triggered, the at least one conductive pad 2 is configured to send a signal to the touch function display panel.

Referring to FIG. 2 and FIG. 3, the conductive member in the present embodiment can be exemplified as a conductive compression spring 3, and the conductive compression spring 3 has a first end portion 31 and a second end portion 32 opposite to the first end portion 31. The first end portion 31 is abutted against the seat 1 and is electrically coupled to the at least one conductive pad 2, but the present disclosure is not limited thereto. For example, in another embodiment of the present disclosure (not shown), the conductive member may also be a wire.

Referring to FIG. 2 and FIG. 3, the operating cover 4 is disposed on the seat 1, and the conductive member is covered by the operating cover 4. The operating cover 4 can be touched by a human to receive a trigger charge.

Additionally, the conductive film 5 is disposed on an inner edge of the operating cover 4 and is abutted against by the second end portion 32, so that the conductive film 5 can receive the trigger charge through the operating cover 4 and can trigger the at least one conductive pad 2 through the conductive member.

It is worth noting that, in practice, the operating cover 4 can be made of insulating material and designed with a thin profile to allow electric charges to pass through the insulating material.

For example, the operating cover 4 can be made of polyethylene terephthalate (PET) polyester plastic, and a thickness of (the body 421 of the shell 42 of) the operating cover 4 can be designed to be less than or equal to 0.2 millimeters, so that the charge from the human body can pass through the thin operating cover 4 (e.g., when a finger contacts the operating cover 4) and transfer to the conductive film 5 located on an inner side of the operating cover 4. Accordingly, the at least one conductive pad 2 can receive the charge via the conductive member to be triggered. In other words, the knob structure 100 of the present disclosure can transmit signals through a gripping operation to control the touch function display panel.

It should be further noted that the knob structure 100 of the present disclosure can also support pressing and rotating operations in addition to the aforementioned gripping operation. Specifically, a quantity of the at least one conductive pad 2 is plural, and the knob structure 100 also includes a plurality of conductive domes 6, a ring circuit board 7, and a plurality of push switches 8.

Figure 4:
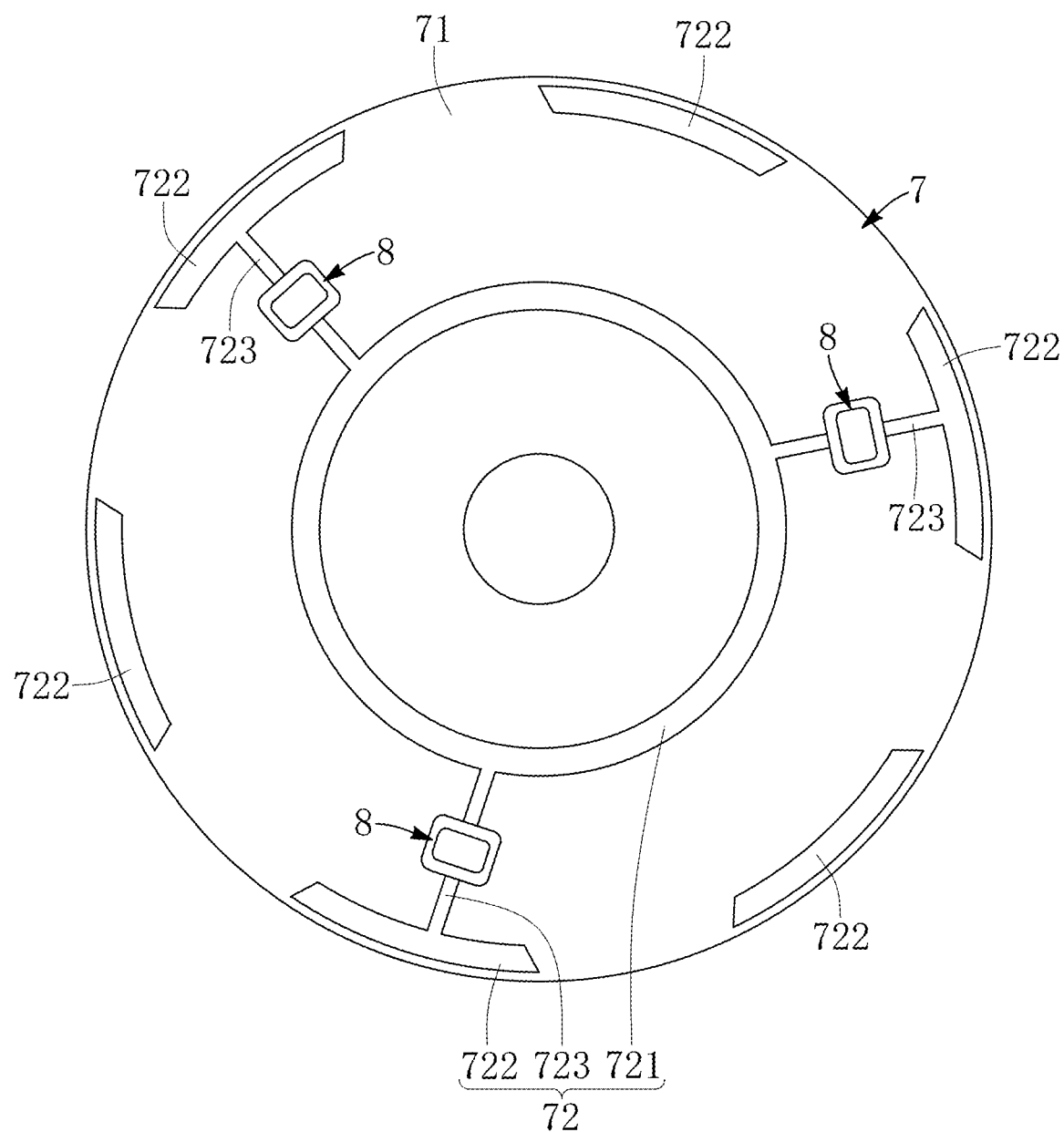
FIG. 4 is schematic plan view of a ring circuit board and a plurality of push switches according to the present disclosure.

Referring to FIG. 2 to FIG. 4, the conductive domes 6 are electrically coupled to the conductive pads 2, and the conductive domes 6 are exposed through the second perforations 12 of the seat 1 to a surface of the seat 1, allowing contact with the circuit layer 72 of the ring circuit board 7.

The ring circuit board 7 is pivotally connected to the seat 1, and includes an insulating carrier 71 and a circuit layer 72 that is disposed on the insulating carrier 71. The circuit layer 72 is controllably and electrically coupled to at least one of the conductive domes 6.

In practice, the ring circuit board 7 can rotate relative to the seat 1. Additionally, the circuit layer 72 includes an annular pad 721, a plurality of independent pads 722, and a plurality of connection circuits 723.

The annular pad 721 is located adjacent to a central side of the ring circuit board 7, and the independent pads 722 are arranged around a periphery of the annular pad 721 that are spaced apart from each other. That is, the independent pads 722 are positioned on an outer peripheral side that is away from a center of the ring circuit board 7. Additionally, each of the connection circuits 723 is arranged between the ring circuit board 7 and one of the independent pads 722, and the connection circuits 723 are respectively connected to the push switches 8. Each of the connection circuits 723 is electrically coupled to the independent pads 722 and the annular pad 721 when a corresponding one of the push switches 8 is pressed. In other words, an open circuit is maintained between the ring circuit board 7 and one of the independent pads 722, and when one the push switches 8 is pressed, the push switch 8 temporarily connects the ring circuit board 7 and a corresponding one of the independent pads 722 through one of the connection circuits 723.

Accordingly, the ring circuit board 7 can, based on a rotational angle of the ring circuit board 7, electrically couple the circuit layer 72 to different conductive domes 6 to provide rotational operation. That is, at least one of the independent pads 722 can be electrically connected to one of the conductive domes 6. Additionally, the push switches 8 can be pressed to trigger temporary connection to provide a pressing operation.

Additionally, in order to cooperate with the pressing operation and the rotating operation, the operating cover 4 in practice can be pivotally connected on the seat 1 and assembled with the ring circuit board 7, so that the operating cover 4 can synchronously drive the ring circuit board 7 to rotate, and can also move along a height direction D1 of the seat 1 to press any one the push switches 8.

Specifically, the operating cover 4 includes a brake ring 41 and a shell 42. The brake ring 41 has a ring seat 411 and a ring wall 412 that is connected to the ring seat 411. The brake ring 41 is pivoted connected on the seat 1 through the ring seat 411 and assembled with the ring circuit board 7, so that the brake ring 41 can rotate relative to the seat 1 and simultaneously drive the ring circuit board 7 to rotate.

The ring seat 411 of the brake ring 41 also has a plurality of through holes 413 corresponding in position to the push switches 8 and a plurality of tooth portions 414 that are arranged in an annular shape. The push switches 8 can be exposed to the ring seat 411 through the through holes 413.

In addition, the shell 42 is assembled with the brake ring 41, and the shell 42 includes a body 421, a ring frame 422 and at least one extension column 423 that are fixed on the body 421.

In practice, the body 421 is sleeved on the brake ring 41, the ring frame 422 is fixed on an inner edge of the body 421, and the ring frame 422 has a convex portion 4221. The body 421 can be temporarily restricted from rotating by having the convex portion 4221 abut against the tooth portion 414. Accordingly, when the shell 42 experiences a rotational force exceeding a threshold, the convex portion 4221 can cross over the tooth portion 414 for providing a tactile feedback during rotation for positioning.

Additionally, the shell 42 can not only rotate relative to the brake ring 41, but also move along the height direction D1, thereby allowing the at least one extension column 423 to press one of the push switches 8. Specifically, the at least one extension column 423 is connected to the inner edge of the body 421, and the at least one extension column 423 corresponds in position to one of the push switches 8. When the shell 42 moves along the height direction D1 toward the seat 1 (e.g., when a finger presses the shell 42), the at least one extension column 423 can press one of the push switches 8, thereby causing one of the connection circuit 723 corresponding to the push switch 8 to be activated.

In addition, the conductive film 5 on the inner edge of the body 421 is abutted against the conductive compression spring 3, so that the body 421 can be reset along the height direction D1 by the conductive compression spring 3.

Preferably, to prevent the conductive compression spring 3 from being displaced due to compression, the knob structure 100 further includes a conductive column 9. The conductive column 9 is fixed on the at least one conductive pad 2, and the conductive column 9 is surrounded by the conductive compression spring 3.

In practice, the conductive column 9 does not interfere with the pressing operation of the shell 42. That is, a height of the conductive column 9 along the height direction D1 is less than a height of the conductive compression spring 3 along the height direction D1, so that (the shell 42 of) the operating cover 4 can move toward the seat 1 along the height direction D1 to squeeze the conductive compression spring 3.

It should be further noted that the aforementioned knob structure 100 is described with an embodiment that includes gripping, pressing, and rotating operations, but the present disclosure is not limited thereto. Specifically, in other embodiments not illustrated herein, components corresponding to the pressing or rotating operations can be omitted from the knob structure 100, as well as their related elements.

Beneficial Effects of the Embodiment

In conclusion, in the knob structure provided by the present disclosure, by virtue of "the first end portion being abutted against the seat and been electrically coupled to the at least one conductive pad," "the conductive film being disposed on an inner edge of the operating cover and being abutted against by the second end portion," and "the conductive film being configured to receive the trigger charge through the operating cover, and being configured to trigger the at least one conductive pad via the conductive member," the knob structure can also transmit signals through a grasping operation to control a touch function display panel.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A knob structure configured to be installed on a touch function display panel, comprising:
   a seat;
   a plurality of conductive pads disposed on the seat, wherein, when the conductive pads are triggered, the conductive pads are configured to send a signal to the touch function display panel;
   a conductive member having a first end portion and a second end portion opposite to the first end portion, wherein the first end portion is abutted against the seat and is electrically coupled to the conductive pads;
   an operating cover disposed on the seat, wherein the operating cover is configured for contact with a human body to receive a trigger charge; and
   a conductive film disposed on an inner edge of the operating cover and abutted against by the second end portion, wherein the conductive film is configured to receive the trigger charge through the operating cover, and is configured to trigger the conductive pads via the conductive member;
   wherein the conductive member is a conductive compression spring, the knob structure further includes a conductive column fixed on the conductive pads, and the conductive column is surrounded by the conductive compression spring;
   a plurality of conductive domes electrically and respectively coupled to the conductive pads;
   a ring circuit board pivotally connected to the seat, wherein the ring circuit board includes a circuit layer, the circuit layer is selectively and electrically coupled to at least one of the conductive domes;
   wherein the operating cover is pivotally connected to the seat and is assembled with the ring circuit board, and the operating cover is configured to synchronously drive the ring circuit board to rotate.

2. The knob structure according to claim 1, wherein a height of the conductive column along a height direction of the seat is less than a height of the conductive compression spring along the height direction, and the operating cover is configured to move toward the seat along the height direction to squeeze the conductive compression spring.

3. The knob structure according to claim 1, wherein the circuit layer includes a plurality of independent pads, and the independent pads are spaced apart from each other and arranged around a periphery of the ring circuit board; wherein, when the ring circuit board is rotated, at least one of the independent pads is configured to be electrically connected to one of the conductive domes, respectively.

4. The knob structure according to claim 1, further comprising:
- a plurality of push switches disposed on the ring circuit board and electrically coupled to the ring circuit board, wherein, when any of the push switches is pressed, one of the conductive pads can be triggered through the ring circuit board;
- wherein the operating cover is configured to move along the height direction of the seat to press against any of the push switches.

5. The knob structure according to claim 4, wherein the circuit layer includes:
- an annular pad;
- a plurality of independent pads arranged around a periphery of the annular pad; and
- a plurality of connection circuits each connected to one of the push switches, wherein each of the connection circuits is pressed by the one of the push switches to electrically couple one of the independent pads and the annular pad, respectively.

6. The knob structure according to claim 4, wherein the operating cover includes:
- a brake ring pivotally connected to the seat and assembled with the ring circuit board, wherein the brake ring is configured to drive the ring circuit board to rotate, and the brake ring has a plurality of tooth portions arranged in an annular manner;
- a shell assembled with the brake ring, wherein the shell includes a body, a ring frame and at least one extension column fixed on the body, the ring frame has a convex portion, and the body is configured to be abutted against any one of the tooth portions through the convex portion to be temporarily restricted from rotating; wherein, when the shell is subjected to a rotational force exceeding a threshold, the convex portion is configured to cross over the tooth portions; wherein the shell is configured to move along the height direction relative to the brake ring; wherein, when the shell moves toward the seat along the height direction, the at least one extension column is configured to resist one of the push switches; and wherein the conductive film is provided on an inner edge of the body.

7. The knob structure according to claim 1, wherein the operating cover includes:
- a brake ring pivotally connected to the seat and assembled with the ring circuit board, wherein the brake ring is configured to drive the ring circuit board to rotate, and the brake ring has a plurality of tooth portions arranged in an annular manner;
- a shell assembled with the brake ring, wherein the shell includes a body, a ring frame and at least one extension column fixed on the body, the ring frame has a convex portion, and the body is configured to be abutted against any one of the tooth portions through the convex portion to be temporarily restricted from rotating; wherein, when the shell is subjected to a rotational force exceeding a threshold, the convex portion is configured to cross over the tooth portions; and wherein the conductive film is provided on an inner edge of the body.

8. The knob structure according to claim 1, wherein the operating cover is made of insulating material.

* * * * *